US010339920B2

(12) United States Patent
Adams et al.

(10) Patent No.: US 10,339,920 B2
(45) Date of Patent: Jul. 2, 2019

(54) PREDICTING PRONUNCIATION IN SPEECH RECOGNITION

(71) Applicant: Amazon Technologies, Inc., Reno, NV (US)

(72) Inventors: Jeffrey Penrod Adams, Tyngsborough, MA (US); Alok Ulhas Parlikar, Somerville, MA (US); Jeffrey Paul Lilly, Seattle, WA (US); Ariya Rastrow, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 19 days.

(21) Appl. No.: 14/196,055

(22) Filed: Mar. 4, 2014

(65) Prior Publication Data

US 2015/0255069 A1    Sep. 10, 2015

(51) Int. Cl.
*G10L 15/187* (2013.01)
*G10L 13/08* (2013.01)
(Continued)

(52) U.S. Cl.
CPC .............. *G10L 15/08* (2013.01); *G10L 13/08* (2013.01); *G10L 15/187* (2013.01); *G10L 2015/025* (2013.01)

(58) Field of Classification Search
CPC .. G10L 15/187; G10L 13/08; G10L 2015/025
See application file for complete search history.

(56) References Cited

U.S. PATENT DOCUMENTS 5,754,972 A * 5/1998 Baker .................... G10L 15/04
704/2

5,867,812 A * 2/1999 Sassano ................ G06F 17/273
704/10
(Continued)

FOREIGN PATENT DOCUMENTS

JP    2002-520664 A    7/2002
JP    2004-503887 A    2/2004
(Continued)

OTHER PUBLICATIONS

Leonardo, B., Claudia, B., & Silvia, Q. (Oct. 2004). A general approach to TTS reading of mixed-language texts. In Proc. of 5th ISCA tutorial and research workshop on speech synthesis.*
(Continued)

*Primary Examiner* — Bryan S Blankenagel
(74) *Attorney, Agent, or Firm* — Pierce Atwood LLP (57) ABSTRACT

An automatic speech recognition (ASR) device may be configured to predict pronunciations of textual identifiers (for example, song names, etc.) based on predicting one or more languages of origin of the textual identifier. The one or more languages of origin may be determined based on the textual identifier. The pronunciations may include a hybrid pronunciation including a pronunciation in one language, a pronunciation in a second language and a hybrid pronunciation that combines multiple languages. The pronunciations may be added to a lexicon and matched to the content item (e.g., song) and/or textual identifier. The ASR device may receive a spoken utterance from a user requesting the ASR device to access the content item. The ASR device determines whether the spoken utterance matches one of the pronunciations of the content item in the lexicon. The ASR device then accesses the content when the spoken utterance matches one of the potential textual identifier pronunciations.

21 Claims, 7 Drawing Sheets

(51) Int. Cl.
*G10L 15/02* (2006.01)
*G10L 15/08* (2006.01)

(56) References Cited

U.S. PATENT DOCUMENTS

| | | | |
|---|---|---|---|
| 6,032,111 A | 2/2000 | Mohri | |
| 6,411,932 B1* | 6/2002 | Molnar | G09B 19/04 |
| | | | 704/254 |
| 6,963,871 B1* | 11/2005 | Hermansen | G06F 17/30634 |
| 7,472,061 B1 | 12/2008 | Alewine et al. | |
| 8,285,537 B2* | 10/2012 | Tanner | G06F 17/273 |
| | | | 704/246 |
| 2002/0065647 A1 | 5/2002 | Hatori | G06F 17/275 |
| | | | 704/2 |
| 2004/0088163 A1* | 5/2004 | Schalkwyk | G10L 15/187 |
| | | | 704/251 |
| 2004/0153306 A1* | 8/2004 | Tanner | G06F 17/273 |
| | | | 704/4 |
| 2004/0210438 A1* | 10/2004 | Gillick | G10L 15/005 |
| | | | 704/254 |
| 2005/0038654 A1* | 2/2005 | Emonts | G10L 15/005 |
| | | | 704/256 |
| 2006/0206331 A1* | 9/2006 | Hennecke | G10L 15/187 |
| | | | 704/254 |
| 2007/0198273 A1* | 8/2007 | Hennecke | G10L 15/26 |
| | | | 704/277 |
| 2007/0245305 A1* | 10/2007 | Anderson | G09B 7/00 |
| | | | 717/110 |
| 2008/0208585 A1 | 8/2008 | Ativanichayaphong | |
| 2009/0182550 A1* | 7/2009 | Alonichau | G06F 17/26 |
| | | | 704/8 |
| 2009/0248395 A1* | 10/2009 | Alewine | G10L 13/08 |
| | | | 704/7 |
| 2009/0326945 A1* | 12/2009 | Tian | G10L 15/005 |
| | | | 704/254 |
| 2010/0082328 A1 | 4/2010 | Rogers | |
| 2010/0082349 A1* | 4/2010 | Bellegarda | G10L 13/08 |
| | | | 704/260 |
| 2010/0106497 A1* | 4/2010 | Phillips | G10L 15/30 |
| | | | 704/231 |
| 2010/0211376 A1* | 8/2010 | Chen | G10L 15/187 |
| | | | 704/2 |
| 2010/0223060 A1* | 9/2010 | Chang | G10L 15/22 |
| | | | 704/272 |
| 2011/0035219 A1* | 2/2011 | Kadirkamanathan | G10L 15/005 |
| | | | 704/239 |
| 2012/0016660 A1* | 1/2012 | Gillam | G06F 17/30985 |
| | | | 704/8 |
| 2012/0072204 A1* | 3/2012 | Nasri | G06F 17/2229 |
| | | | 704/9 |
| 2012/0303657 A1* | 11/2012 | Yang | G06F 17/2863 |
| | | | 707/769 |
| 2012/0330989 A1* | 12/2012 | Tan | G06F 17/289 |
| | | | 707/760 |
| 2013/0179170 A1 | 7/2013 | Cath | |
| 2013/0238336 A1 | 9/2013 | Sung | |
| 2014/0278421 A1* | 9/2014 | Komissarchik | G09B 19/06 |
| | | | 704/251 |

FOREIGN PATENT DOCUMENTS

| | | |
|---|---|---|
| JP | 2004-341520 A | 12/2004 |
| JP | 2009-175630 A | 8/2009 |
| JP | 2012-518207 A | 8/2012 |

OTHER PUBLICATIONS

Schatz, M. (2012). The creation of Sinism: Mongolian-Chinese language contact in Inner Mongolia. More Morphologies: Contributions to the Festival of Languages, Bremen, Sep. 17 to Oct. 7, 2009, 35, 89.*

International Search Report for PCT/US15/17927, dated Jun. 8, 2015, Applicant: Amazon Technologies, Inc., 3 pages.

International Preliminary Report on Patentability, dated Sep. 15, 2016, Applicant: Amazon Technologies, Inc., 7 pages.

Maison et al., "Pronunciation Modeling for Names of Foreign Origin", Automatic Speech Recognition and Understanding, IEEE, pp. 429-434, 2003.

European Search Report, dated Sep. 22, 2017, Applicant: Amazon Technologies, Inc., 9 pages.

Japanese Office Action in 2016-555771, dated Aug. 30, 2018.

European Office Action in 15 757 998.8, dated Sep. 18, 2018.

* cited by examiner

PREDICTING PRONUNCIATION IN SPEECH RECOGNITION

BACKGROUND

Human-computer interactions have progressed to the point where humans can control computing devices, and provide input to those devices, by speaking. Computing devices employ techniques to identify the words spoken by a human user based on the various qualities of a received audio input. Such techniques are called speech recognition or automatic speech recognition (ASR). Speech recognition combined with language processing techniques may allow a user to control a computing device to perform tasks based on the user's spoken commands. Speech recognition may also convert a user's speech into text data, which may then be provided to various textual based programs and applications.

Computers, hand-held devices, telephone computer systems, kiosks, and a wide variety of other devices to improve human-computer interactions may use speech recognition.

BRIEF DESCRIPTION OF DRAWINGS

For a more complete understanding of the present disclosure, reference is now made to the following description taken in conjunction with the accompanying drawings.

DETAILED DESCRIPTION

In interacting with a device capable of performing automatic speech recognition (ASR), a user may speak a command to access content items. Those content items may be stored locally with the device or may be stored remotely, but are accessible by the device. For example, a user may speak a command to a computing device to "play" a certain item of music. The spoken command may be referred to as an utterance. The item of music may be identified by a textual identifier. The textual identifier may be text that identifies an item of content such as a song, video, etc. Example textual identifiers include a name of an artist, a band name, an album title, a song title, or some other label that identifies the music to be played.

The ASR system may have a lexicon of stored textual identifiers (i.e., artist names, band names, album titles, and song titles) matched to their corresponding expected pronunciations, where the expected pronunciations are based on the textual identifier. The lexicon may be stored locally or remotely. When the ASR system receives an utterance, it may match the sound of the utterance to the stored expected pronunciations to match the utterance with one or more content items for retrieval. For example, if the user says "play some songs by AC/DC" the system may match the audio corresponding with "AC/DC" to the corresponding expected pronunciation and then to the band name. Once the band is identified, the device may then playback songs associated with the band.

Typical ASR systems are each individually associated with a certain language. For example, an English ASR system may be configured to understand English words, a German ASR system may be configured to understand German words, etc. Some textual identifiers may originate from a foreign language that is not the main language of the ASR system. This may lead to confusion if a user attempts to pronounce the textual identifier using linguistic traits of the foreign language textual identifier. For example, a user who speaks an utterance requesting music using a German pronunciation of a German song title or German band name, may confuse an English based ASR system. Similarly, a user who uses an English pronunciation of a German song title may also confuse the ASR system due to the ASR system potentially expecting a different pronunciation based on the text of the song title.

Offered is a method for determining an expected pronunciation of a textual identifier based on predicting a language of origin of the textual identifier. The language of origin may be determined based on the textual identifier. In some aspects of the disclosure, the expected pronunciation of the textual identifier may also be based on a pronunciation history of a particular user or category of users. The expected pronunciation may include a combination of expected pronunciation based on language of origin, for example an expected pronunciation having certain phonemes of a textual identifier expected as if having one language of origin and other phonemes of the textual identifier expected as if having a different language of origin. Further, multiple expected pronunciations may be determined for each textual identifier, where each expected pronunciation may be associated with a likelihood of occurrence. The likelihood may be based on the textual identifier, the behavior of the user, the behavior of other users, or other factors.

Different expected pronunciations of textual identifiers may be added to the lexicon and to accommodate different pronunciations from different users. The expected pronunciations may be linked to content items, such as a song stored in a music catalog. When the computing device receives a spoken utterance including a textual identifier, the computing device determines whether the spoken utterance includes a textual identifier by matching the utterance to the modified lexicon of expected pronunciations. When the spoken utterance matches an expected pronunciation, the computing device acts on the content as indicated in the command portion of the utterance, for example by playing the requested song.

Figure 1:
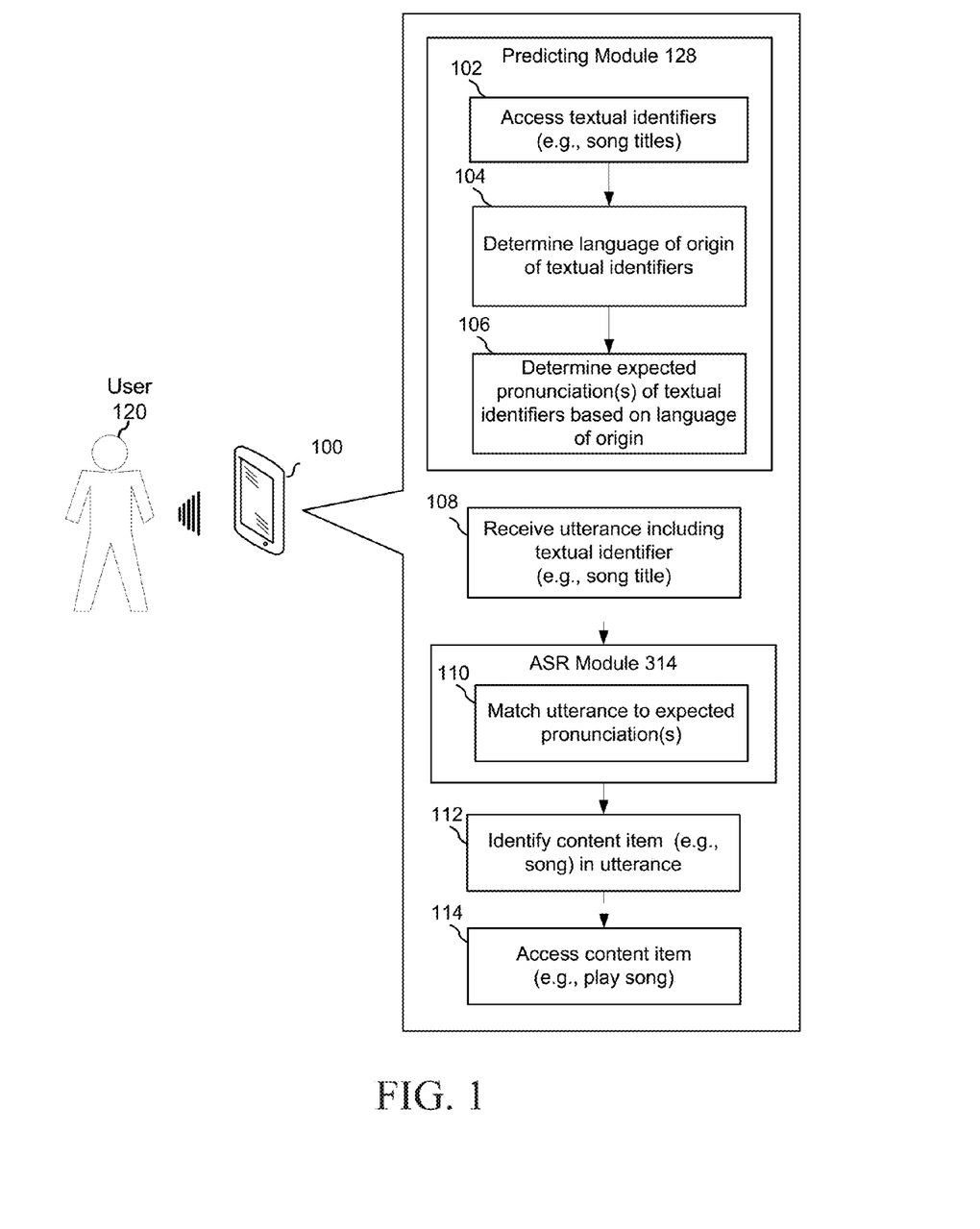
FIG. 1 illustrates a speech recognition technique for predicting an expected pronunciation of a word of foreign origin based on a language of origin of the word according to one aspect of the present disclosure.

FIG. 1 illustrates a speech recognition technique for predicting an expected pronunciation of a textual identifier based on a language of origin of the textual identifier according to one aspect of the present disclosure. FIG. 1 includes an ASR device 100 with an expected pronunciation predicting module 128 and ASR module 314 and a user 120 positioned proximate to the ASR device 100. The expected pronunciation predicting module 128 may be configured to access textual identifiers (such as song titles), as shown in block 102, and determine the language of origin of the textual identifiers, as shown in block 104. The predicting module 128 may then determine one or more expected pronunciations of textual identifiers based on the language of origin, as shown in block 106. The expected pronunciations may be matched to the content items (e.g., songs) for retrieval by the system. The predicting module 128 may perform these actions ahead of time, that is when configuring or training operation of the ASR system prior to receiving an utterance.

Upon the device receiving a spoken utterance, shown in block 108, the utterance is passed to the ASR module 314. The ASR module may then match the utterance to an expected pronunciation, as shown in block 110. That expected pronunciation may then be matched to a content item, such as a song, referred to in the utterance as shown in block 112. The device may then access the content item (e.g., play the song) as shown in block 114.

Although FIG. 1 illustrates certain tasks being performed by certain modules, tasks may be performed by various modules as configured by the particular ASR system.

Further, the techniques described here may be performed on a local device, such as the ASR device 100, a networked device, or some combination of different devices. For example, a local device and remote device may exchange textual identifiers of the local device for the remote device to actually perform the determination of language of origin and expected pronunciation(s). Further, while the local device may receive audio data comprising the spoken utterance, the local device may send the audio data to a remote device for processing. The remote device may then perform ASR processing on the audio. The ASR results may then be sent to the local device for matching the utterance to a content item and accessing the content item, or those tasks may be performed by the remote device and the results (for example, the streaming song) sent to the local device for playback to the user. Alternatively, the local device and remote device may work together in other ways.

Figure 2:
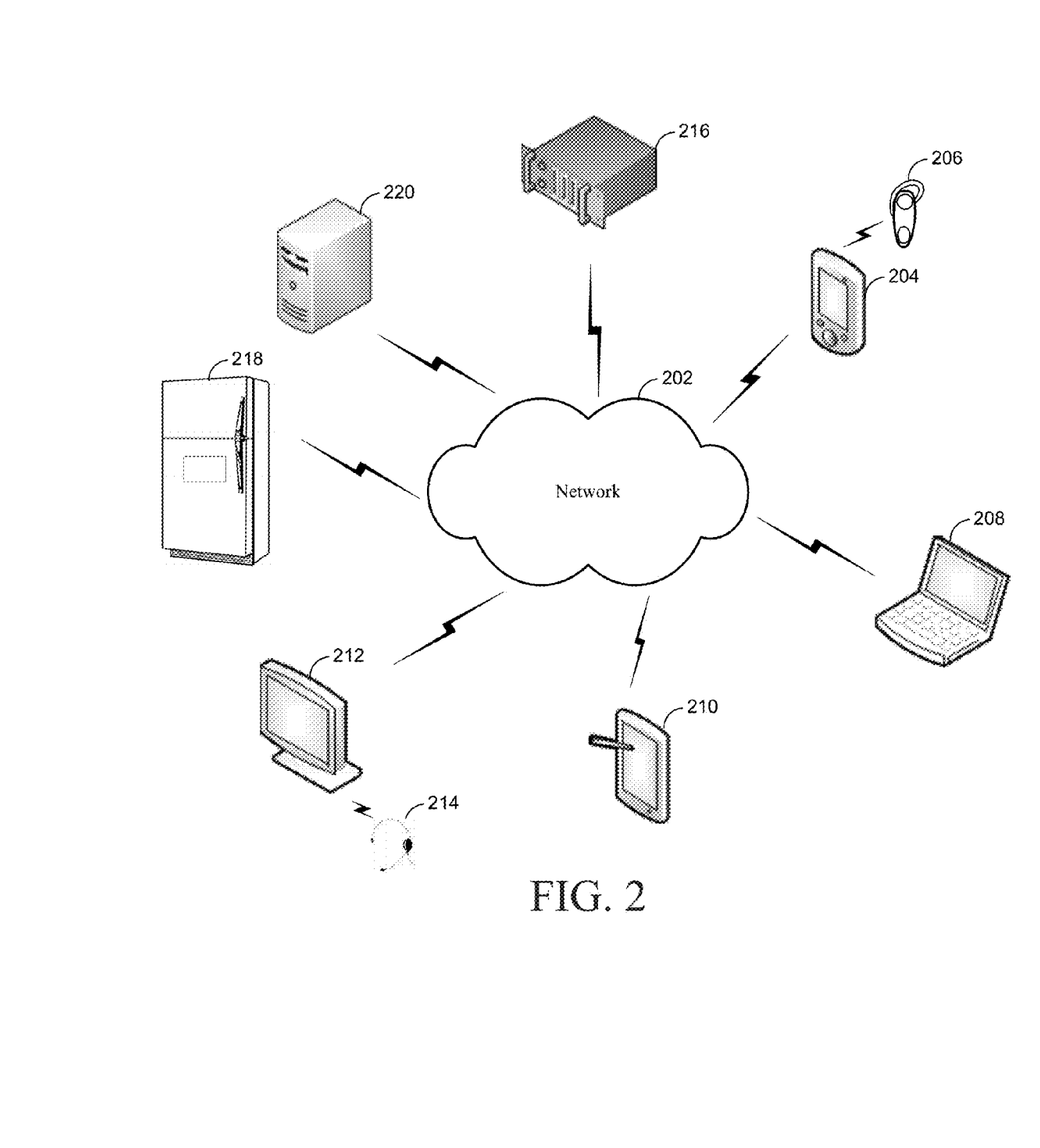
FIG. 2 illustrates a computer network for use with distributed speech recognition according to one aspect of the present disclosure.

These multiple ASR devices may be connected over a network. As shown in FIG. 2 multiple devices may be connected over network 202. Network 202 may include a local or private network or may include a wide network such as the internet. Devices may be connected to the network 202 through either wired or wireless connections. For example, a wireless device 204 may be connected to the network 202 through a wireless service provider. Other devices, such as computer 212, may connect to the network 202 through a wired connection. Other devices, such as a refrigerator 218, for example, located in a home or shopping establishment may connect to the network 202 through a wired or wireless connection. Other devices, such as laptop 208 or tablet computer 210 may be capable of connection to the network 202 using various connection methods including through a wireless service provider, over a WiFi connection, or the like. Networked devices may input spoken audio through a number of audio input devices including through headsets 206 or 214. Audio input devices may be connected to networked devices either through a wired or wireless connection. Networked devices may also include embedded audio input devices, such as an internal microphone (not pictured) in laptop 208, wireless device 204 or table computer 210.

In certain ASR system configurations, one device may capture an audio signal and another device may perform the ASR processing. For example, audio input to the headset 214 may be captured by computer 212 and sent over the network 202 to computer 220 or server 216 for processing. Alternatively, computer 212 may partially process the audio signal before sending it over the network 202. Because ASR processing may involve significant computational resources, in terms of both storage and processing power, such split configurations may be employed where the device capturing the audio has lower processing capabilities than a remote device and higher quality ASR results are desired. The audio capture may occur near a user and the captured audio signal sent to another device for processing. For example, one or more microphone arrays may be located in different locations from an ASR device and the captured audio may be sent from the arrays to the ASR device (or devices) for processing.

Figure 3:
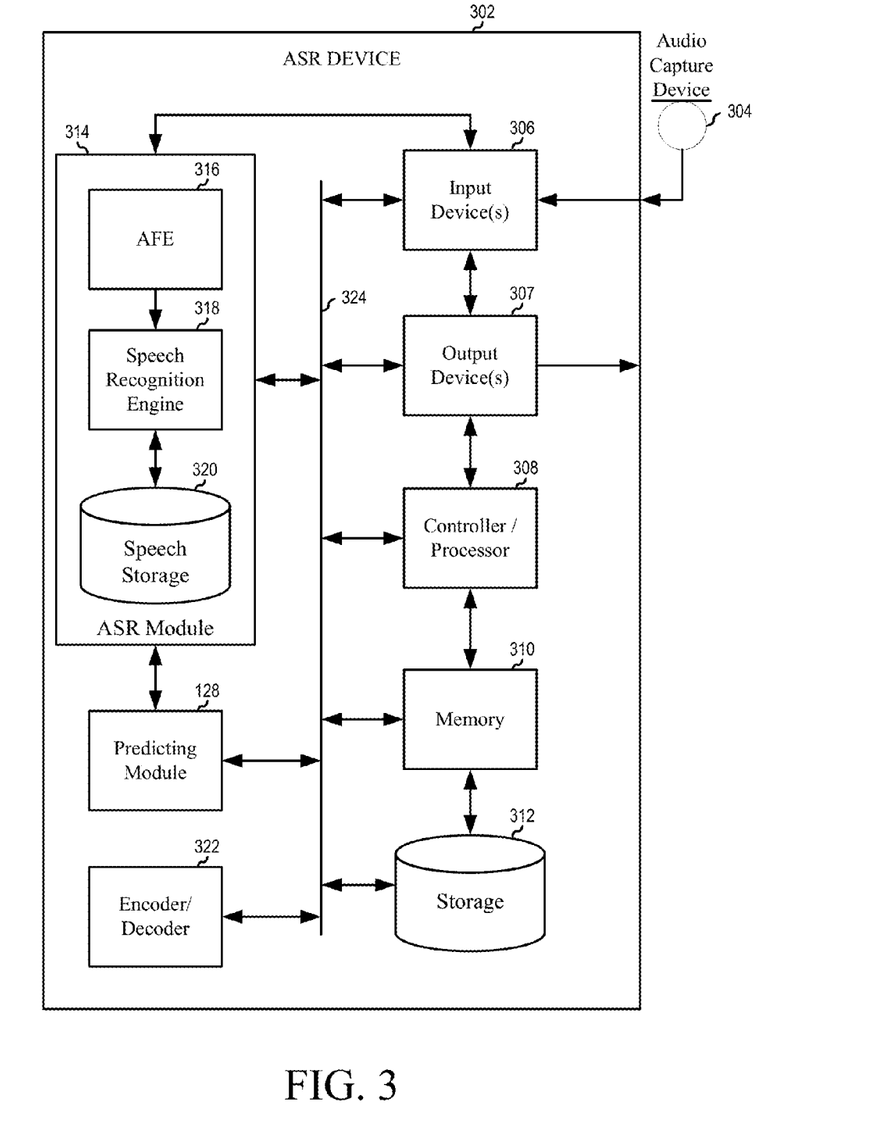
FIG. 3 is a block diagram conceptually illustrating a device for speech recognition according to one aspect of the present disclosure.

FIG. 3 shows an automatic speech recognition (ASR) device 302 for performing speech recognition. Aspects of the present disclosure include computer-readable and computer-executable instructions that may reside on the ASR device 302. FIG. 3 illustrates a number of components that may be included in the ASR device 302, however other non-illustrated components may also be included. Also, some of the illustrated components may not be present in every device capable of employing aspects of the present disclosure. Further, some components that are illustrated in the ASR device 302 as a single component may also appear multiple times in a single device. For example, the ASR device 302 may include multiple input devices 306, output devices 307 or multiple controllers/processors 308.

Multiple ASR devices may be employed in a single speech recognition system. In such a multi-device system, the ASR devices may include different components for performing different aspects of the speech recognition process. The multiple devices may include overlapping components. The ASR device as illustrated in FIG. 3 is exemplary, and may be a stand-alone device or may be included, in whole or in part, as a component of a larger device or system.

The teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc. The ASR device 302 may also be a component of other devices or systems that may provide speech recognition functionality such as automated teller machines (ATMs), kiosks, home appliances (such as refrigerators, ovens, etc.), vehicles (such as cars, busses, motorcycles, etc.), and/or exercise equipment, for example.

As illustrated in FIG. 3, the ASR device 302 may include an audio capture device 304 for capturing spoken utterances for processing. The audio capture device 304 may include a microphone or other suitable component for capturing sound. The audio capture device 304 may be integrated into the ASR device 302 or may be separate from the ASR device 302. The ASR device 302 may also include an address/data bus 324 for conveying data among components of the ASR device 302. Each component within the ASR device 302 may also be directly connected to other components in addition to (or instead of) being connected to other components across the bus 324. Although certain components are illustrated in FIG. 3 as directly connected, these connections are illustrative only and other components may be directly connected to each other (such as the ASR module 314 to the controller/processor 308).

The ASR device 302 may include a controller/processor 308 that may be a central processing unit (CPU) for processing data and computer-readable instructions and a memory 310 for storing data and instructions. The memory 310 may include volatile random access memory (RAM), non-volatile read only memory (ROM), and/or other types of memory. The ASR device 302 may also include a data storage component 312, for storing data and instructions. The data storage component 312 may include one or more storage types such as magnetic storage, optical storage, solid-state storage, etc. The ASR device 302 may also be connected to removable or external memory and/or storage (such as a removable memory card, memory key drive, networked storage, etc.) through the input device 306 or output device 307. Computer instructions for processing by the controller/processor 308 for operating the ASR device 302 and its various components may be executed by the controller/processor 308 and stored in the memory 310, storage 312, external device, or in memory/storage included in the ASR module 314 discussed below. Alternatively, some or all of the executable instructions may be embedded in hardware or firmware in addition to or instead of software. The teachings of this disclosure may be implemented in various combinations of software, firmware, and/or hardware, for example.

The ASR device 302 includes input device(s) 306 and output device(s) 307. A variety of input/output device(s) may be included in the device. Example input devices 306 include an audio capture device 304, such as a microphone (pictured as a separate component), a touch input device, keyboard, mouse, stylus or other input device. Example output devices 307 include a visual display, tactile display, audio speakers, headphones, printer or other output device. The input device 306 and/or output device 307 may also include an interface for an external peripheral device connection such as universal serial bus (USB), a high performance serial bus (e.g., FireWire), a hardware interface (e.g., Thunderbolt) or other connection protocol. The input device 306 and/or output device 307 may also include a network connection such as an Ethernet port, modem, etc. The input device 306 and/or output device 307 may also include a wireless communication device, such as radio frequency (RF), infrared, a wireless technology standard for exchanging data over short distances (e.g., Bluetooth), wireless local area network (WLAN) (such as WiFi), or wireless network radio, such as a radio capable of communication with a wireless communication network such as a Long Term Evolution (LTE) network, WiMAX network, 3G network, etc. Through the input device 306 and/or output device 307, the ASR device 302 may connect to a network, such as the Internet or private network, which may include a distributed computing environment.

The device may also include an ASR module 314 for processing spoken audio data into text. The ASR module 314 transcribes audio data into text data representing the words of the speech contained in the audio data. The text data may then be used by other components for various purposes, such as executing system commands, inputting data, etc. Audio data including spoken utterances may be processed in real time or may be saved and processed at a later time. A spoken utterance in the audio data is input to the ASR module 314, which then interprets the utterance based on the similarity between the utterance and models known to the ASR module 314. For example, the ASR module 314 may compare the input audio data with models for sounds (e.g., speech units or phonemes) and sequences of sounds to identify words that match the sequence of sounds spoken in the utterance of the audio data. The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model), and the likelihood that a particular word which matches the sounds would be included in the sentence at the specific location (e.g., using a language model or grammar). Based on the considered factors and the assigned recognition score, the ASR module 314 may output the most likely words recognized in the audio data. The ASR module 314 may also output multiple alternative recognized words in the form of a lattice or an N-best list (described in more detail below).

While a recognition score may represent a probability that a portion of audio data corresponds to a particular phoneme or word, the recognition score may also incorporate other information, which indicates the ASR processing quality of the scored audio data relative to the ASR processing of other audio data. A recognition score may be represented as a number on a scale from 1 to 100, as a probability from 0 to 1, a log probability or other indicator. A recognition score may indicate a relative confidence that a section of audio data corresponds to a particular phoneme, word, etc.

The ASR module 314 may be connected to the bus 324, input device(s) 306 and/or output device(s) 307, audio capture device 304, encoder/decoder 322, controller/processor 308 and/or other component of the ASR device 302. Audio data sent to the ASR module 314 may come from the audio capture device 304 or may be received by the input device 306, such as audio data captured by a remote entity and sent to the ASR device 302 over a network. Audio data may be in the form of a digitized representation of an audio waveform of spoken utterances. The sampling rate, filtering, and other aspects of the analog-to-digital conversion process may impact the overall quality of the audio data. Various settings of the audio capture device 304 and input device 306 may be configured to adjust the audio data based on traditional tradeoffs of quality versus data size or other considerations.

The ASR module 314 includes an acoustic front end (AFE) 316, a speech recognition engine 318, and speech storage 320. The AFE 316 transforms audio data into data for processing by the speech recognition engine 318. The speech recognition engine 318 compares the speech recognition data with the acoustic, language, and other data models and information stored in the speech storage 320 for recognizing the speech contained in the original audio data. The AFE 316 and speech recognition engine 318 may include their own controller(s)/processor(s) and memory or they may use the controller/processor 308 and memory 310 of the ASR device 302, for example. Similarly, the instructions for operating the AFE 316 and speech recognition engine 318 may be located within the ASR module 314, within the memory 310 and/or storage 312 of the ASR device 302, or within an external device.

Figure 4:
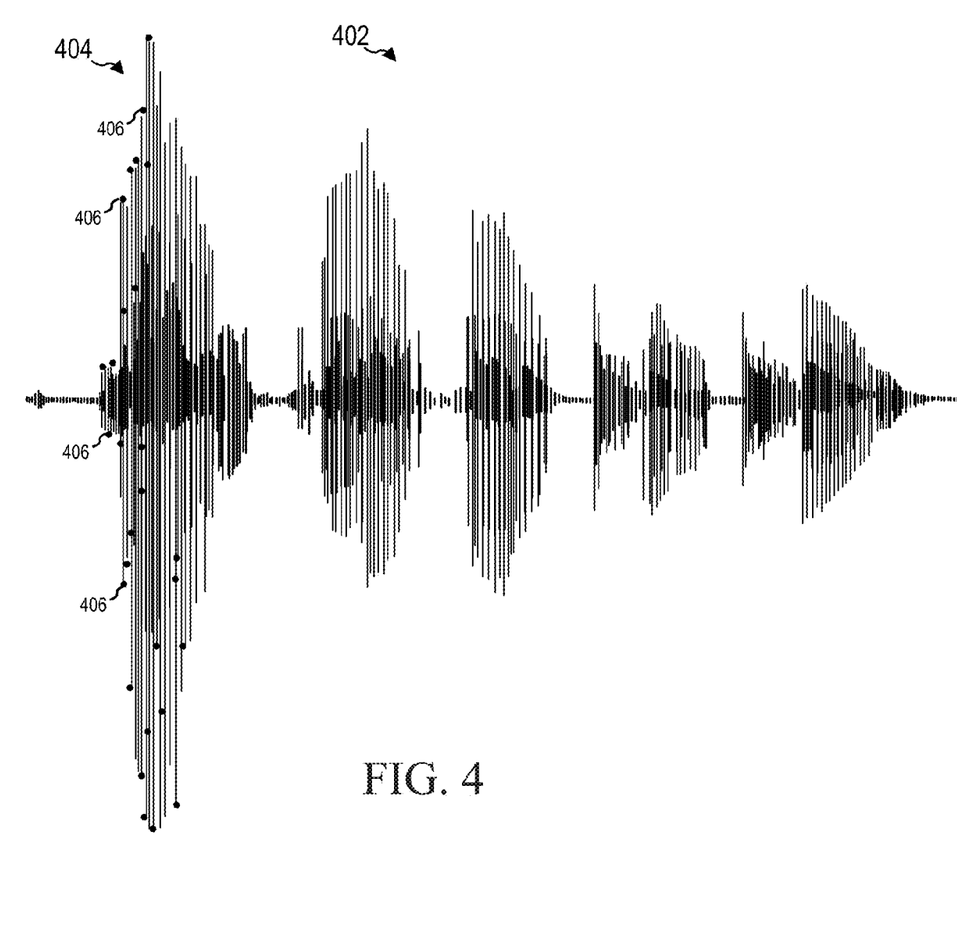
FIG. 4 illustrates an audio waveform processed according to one aspect of the present disclosure.

Received audio data may be sent to the AFE 316 for processing. The AFE 316 may reduce noise in the audio data, identify parts of the audio data containing speech for processing, and segment and process the identified speech components. The AFE 316 may divide the digitized audio data into frames or audio segments, with each frame representing a time interval, for example 10 milliseconds (ms). During that frame, the AFE 316 determines a set of values, called a feature vector, representing the features/qualities of the utterance portion within the frame. Feature vectors may contain a varying number of values, for example forty. The feature vector may represent different qualities of the audio data within the frame. FIG. 4 shows a digitized audio data waveform 402, with multiple points 406 of the first word 404 as the first word 404 is being processed. The audio qualities of those points may be stored into feature vectors. Feature vectors may be streamed or combined into a matrix that represents a time period of the spoken utterance. These feature vector matrices may then be passed to the speech recognition engine 318 for processing. A number of approaches may be used by the AFE 316 to process the audio data. Such approaches may include using mel-frequency cepstral coefficients (MFCCs), perceptual linear predictive (PLP) techniques, neural network feature vector techniques, linear discriminant analysis, semi-tied covariance matrices, or other approaches known to those of skill in the art.

Processed feature vectors may be output from the ASR module 314 and sent to the output device 307 for transmission to another device for further processing. The feature vectors may be encoded and/or compressed by the encoder/decoder 322 prior to transmission. The encoder/decoder 322 may be customized for encoding and decoding ASR data, such as digitized audio data, feature vectors, etc. The encoder/decoder 322 may also encode non-ASR data of the ASR device 302, for example using a general encoding scheme such as .zip, etc. The functionality of the encoder/decoder 322 may be located in a separate component, as illustrated in FIG. 3, or may be executed by the controller/processor 308, ASR module 314, or other component, for example.

The speech recognition engine 318 may process the output from the AFE 316 with reference to information stored in the speech storage 320. Alternatively, post front-end processed data (such as feature vectors) may be received by the ASR module 314 from another source besides the internal AFE 316. For example, another entity may process audio data into feature vectors and transmit that information to the ASR device 302 through the input device(s) 306. Feature vectors may arrive at the ASR device 302 encoded, in which case they may be decoded (for example by the encoder/decoder 322) prior to processing by the speech recognition engine 318.

The speech storage 320 includes a variety of information for speech recognition such as data matching pronunciations of phonemes to particular words. This data may be referred to as an acoustic model. The speech storage may also include a dictionary of words or a lexicon. The speech storage may also include a lexicon matching textual identifiers to expected pronunciations of those identifiers. The textual identifier may identify digital content such as music in catalog, contents in an address book, and/or other content stored at the ASR device (or elsewhere). The textual identifier may also identify non-digital items, such as food items (i.e., ingredients, dishes, etc.), restaurants, events, or other items that may have names that originate in languages(s) that may differ from a default language of the ASR system and/or user. The speech storage may also include data describing words that are likely to be used together in particular contexts. This data may be referred to as a language or grammar model. The speech storage 320 may also include a training corpus that may include recorded speech and/or corresponding transcription, that may be used to train and improve the models used by the ASR module 314 in speech recognition. The training corpus may be used to train the speech recognition models, including the acoustic models and language models, in advance. The models may then be used during ASR processing.

The training corpus may include a number of sample utterances with associated feature vectors and associated correct text that may be used to create, for example, acoustic models and language models. The sample utterances may be used to create mathematical models corresponding to expected audio for particular speech units. Those speech units may include a phoneme, syllable, part of a syllable, word, etc. The speech unit may also include a phoneme in context such as a triphone, quinphone, etc. Phonemes in context used regularly in speech may be associated with their own models. Phonemes in context that are less common may be clustered together to have a group model. By clustering phoneme groups in this manner, fewer models may be included in the training corpus, thus easing ASR processing. The training corpus may include multiple versions of the same utterance from different speakers to provide different utterance comparisons for the ASR module 314. The training corpus may also include correctly recognized utterances as well as incorrectly recognized utterances. These incorrectly recognized utterances may include grammar errors, false recognition errors, noise, or other errors that provide the ASR module 314 with examples of error types and corresponding corrections, for example. The training corpus may include words of foreign origin to train the ASR system to recognize such words. The training corpus may also be adapted to incorporate tendencies of particular users to improve system performance as described below.

Other information may also be stored in the speech storage 320 for use in speech recognition. The contents of the speech storage 320 may be prepared for general ASR use or may be customized to include sounds and words that are likely to be used in a particular application. For example, for ASR processing at an ATM (automated teller machine), the speech storage 320 may include customized data specific to banking transactions. In certain instances, the speech storage 320 may be customized for an individual user based on his/her individualized speech input. To improve performance, the ASR module 314 may revise/update the contents of the speech storage 320 based on feedback of the results of ASR processing, thus enabling the ASR module 314 to improve speech recognition beyond the capabilities provided in the training corpus.

The speech recognition engine 318 attempts to match received feature vectors to words or subword units as known in the speech storage 320. A subword unit may be a phoneme, phoneme in context, syllable, part of a syllable, syllable in context, or any other such portion of a word. The speech recognition engine 318 computes recognition scores for the feature vectors based on acoustic information and language information. The acoustic information is used to calculate an acoustic score representing a likelihood that the intended sound represented by a group of feature vectors matches a subword unit. The language information is used to adjust the acoustic score by considering what sounds and/or words are used in context with each other, thereby improving the likelihood that the ASR module outputs speech results that make sense grammatically.

The speech recognition engine 318 may use a number of techniques to match feature vectors to phonemes or other phonetic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 318, the state may change or stay the same, based on the processing of the new feature vectors. A Viterbi algorithm may be used to find the most likely sequence of states based on the processed feature vectors.

The probabilities and states may be calculated using a number of techniques. For example, probabilities for each state may be calculated using a Gaussian model, Gaussian mixture model, or other technique based on the feature vectors and the contents of the speech storage 320. Techniques such as maximum likelihood estimation (MLE) may be used to estimate the probability of phoneme states.

In addition to calculating potential states for one phoneme as a potential match to a feature vector, the speech recognition engine 318 may also calculate potential states for other phoneme as potential matches for the feature vector. In this manner, multiple states and state transition probabilities may be calculated.

The probable states and probable state transitions calculated by the speech recognition engine 318 may be formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

Figure 5:
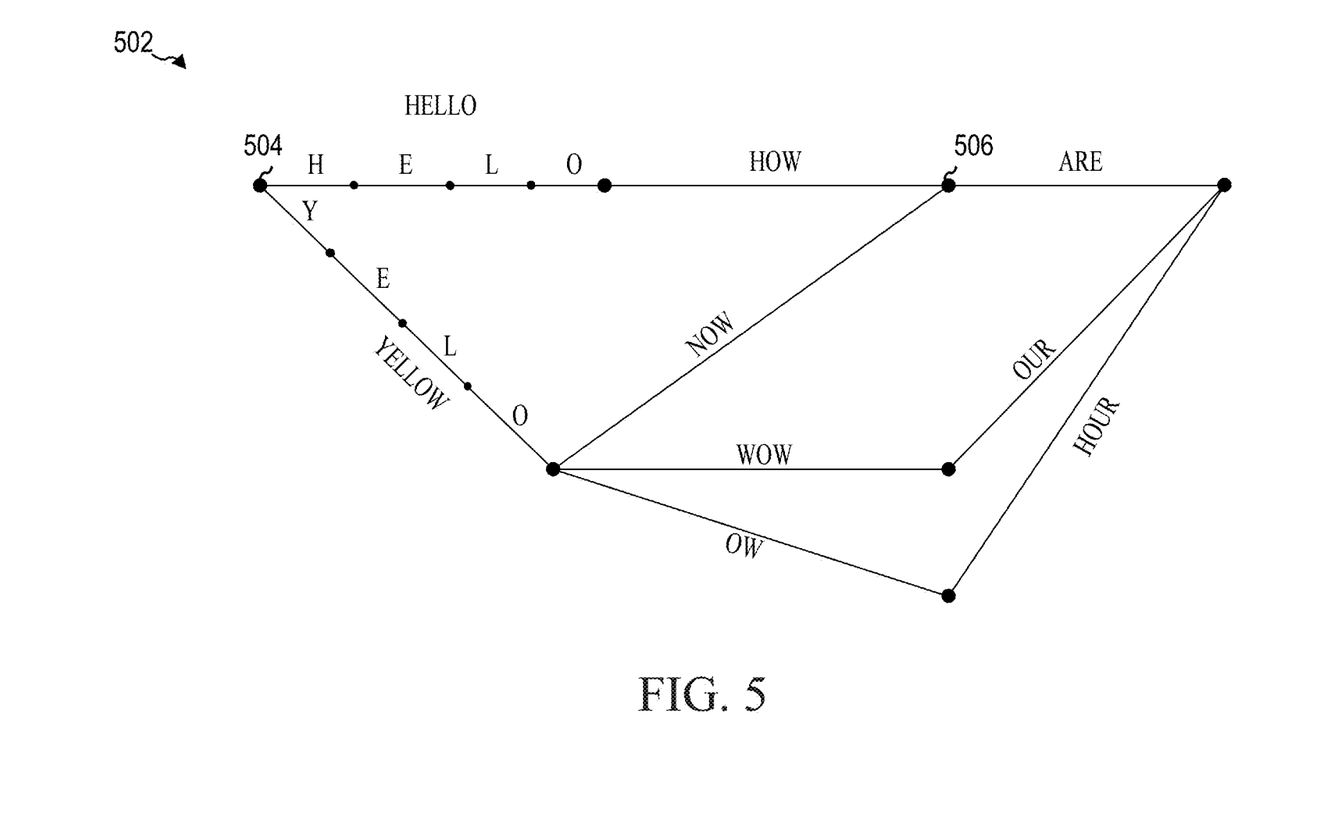
FIG. 5 illustrates a speech recognition lattice according to one aspect of the present disclosure.

The speech recognition engine 318 may combine potential paths into a lattice representing speech recognition results. A sample lattice is shown in FIG. 5. The lattice 502 shows multiple potential paths of speech recognition results. Paths between large nodes represent potential words (for example "hello", "yellow", etc.) and paths between smaller nodes represent potential phonemes (for example "H", "E", "L", "O" and "Y", "E", "L", "O"). For purposes of illustration, individual phonemes are only shown for the first two words of the lattice. The two paths between node 504 and node 506 represent two potential word choices, "hello how" or "yellow now". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the speech recognition engine 318 as the ASR result for the associated feature vectors.

Following ASR processing, the ASR results may be sent by the ASR module 314 to another component of the ASR device 302, such as the controller/processor 308 for further processing (such as execution of a command included in the interpreted text) or to the output device 307 for sending to an external device.

The speech recognition engine 318 may also compute scores of branches of the paths based on language models or grammars. Language modeling involves determining scores for what words are likely to be used together to form coherent words and sentences. Application of a language model may improve the likelihood that the ASR module 314 correctly interprets the speech contained in the audio data. For example, acoustic model processing returning the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance. The language modeling may be determined from a training corpus stored in the speech storage 320 and may be customized for particular applications. Language models may be performed using techniques such as an N-gram model where a probability of seeing a particular next word depends on the context history of the preceding n−1 words. N-gram models may also be structured as bigram (where n=2) and trigram (where n=3) models where the probability of seeing a next word depends on the previous word (in the case of a bigram model) or on the previous two words (in the case of a trigram model). Acoustic models may also apply N-gram techniques.

As part of the language modeling (or in other phases of the ASR processing) the speech recognition engine 318 may, to save computational resources, prune and discard low recognition score states or paths that have little likelihood of corresponding to the spoken utterance, either due to low recognition score pursuant to the language model, or for other reasons. Further, during the ASR processing the speech recognition engine 318 may iteratively perform additional processing passes on previously processed utterance portions. Later passes may incorporate results of earlier passes to refine and improve results. As the speech recognition engine 318 determines potential words from the input audio the lattice may become very large as many potential sounds and words are considered as potential matches for the input audio. The potential matches may be illustrated as a word result network. A speech recognition result network is a connected network of arcs and nodes representing possible sequences of speech units that may be recognized and the likelihood of each sequence. A word result network is a speech recognition result network at the word level. Other level speech recognition networks are also possible. A result network may be generated by any type of speech recognition decoder (or engine). For example, a result network may be generated by a finite state transducer (FST) based decoder. A result network may be used to create a final set of speech recognition results, such as a lattice of the highest scoring results or an N-best list. A neural network may also be used to perform ASR processing.

The speech recognition engine 318 may return an N-best list of paths along with their respective recognition scores, corresponding to the top N paths as determined by the speech recognition engine 318. An application (such as a program or component either internal or external to the ASR device 302) that receives the N-best list may then perform further operations or analysis on the list given the list and the associated recognition scores. For example, the N-best list may be used in correcting errors and training various options and processing conditions of the ASR module 314. The speech recognition engine 318 may compare the actual correct utterance with the best result and with other results on the N-best list to determine why incorrect recognitions received certain recognition scores. The speech recognition engine 318 may correct its approach (and may update information in the speech storage 320) to reduce the recognition scores of incorrect approaches in future processing attempts.

ASR devices may be used to process speech commands related to content items. The content items themselves may be stored locally on an ASR device (such as a music collection on a mobile phone) or stored remotely (such as movies that may be streamed from a remote server). Those content items may include, for example, music, electronic books (e-books), movies, contact information, documents, short message service communications, emails and/or other audio, video or textual information. Users of the ASR device may request to access such content items for various purposes, including playback, editing, forwarding, etc. For example, user may request that a mobile phone may play music in response to the spoken request from a user. To execute the request from the user, a catalog of the content items may be linked to a dictionary of words or a lexicon. The lexicon may include textual identifiers which may be textual identifiers linked to the individual content items. For example, a textual identifier may include a name of an artist, an album title, a song/movie/e-book title or the like. Each textual identifier may correspond to one or more items of content in the catalog (such as a band name being linked to multiple songs) and each content item may be linked to one or more textual identifiers (such as a song linked to a song title, band name, album name, etc.). The textual identifiers may also refer to items other than digital content.

As noted, the lexicon also may include one or more expected pronunciations of each textual identifier, which allows the user to access associate content items through a speech command. For example, the user may attempt to play a song stored in the music catalog by saying the name of the artist, album or song title. The expected pronunciation may be determined based on a spelling of the word. The process of determining the expected pronunciation of the word based on the spelling is defined as grapheme to phoneme (G2P) conversion or pronunciation guessing (commonly referred to as pronguessing). In some instances, textual identifiers may include words of foreign origin. For illustrative purpose, the word of foreign origin (or foreign word) referred to in this application is deemed to be of foreign origin relative to a default language of the ASR system. For present purposes, the ASR system default language is illustrated as English, though the techniques discussed herein may be applied to ASR systems based in different languages.

To assist with ASR processing of textual identifiers that incorporate words or linguistic features of different languages, the present disclosure offers a system where the ASR system is configured to expect one or more pronunciations of the textual identifier based on a language origin of the textual identifier. In one aspect of the present disclosure, the ASR system determines a language of origin of a textual identifier based on the textual identifier. The ASR system then determines an expected pronunciation of the textual identifier based on the text and the identified language of origin. The ASR system may determine multiple expected pronunciations for a particular textual identifier, each with an associated likelihood. The expected pronunciations (and/or their associated likelihoods) may also be adjusted based on the pronunciation tendency of a user or group of users. The expected pronunciations may be added to the lexicon and linked to their respective content items for eventual retrieval by the ASR system.

To determine a language of origin an ASR system may employ a classifier that predicts language origin based on the spelling/textual identifier. The classifier may be a statistical model, such as a character based statistical model. As textual identifiers (e.g., band names) may be short relative to long form text such as literature, paragraphs or the like, the classifier for predicting a language of origin may focus on basic language units of the short text, rather than detection based on stringing multiple texts of a paragraph which may be used by other language predicting systems. For example, the classifier may be trained to identify a likelihood of a sequence of letters in one or more languages (e.g., language A, B or C). In some aspects, the likelihood of each language may be learned separately. The classifier may also implement an n-gram based character model for words from different languages. The n-gram may be based on a sequence of items such as phonemes, syllables, letters, words or base pairs according to different configurations of the ASR system.

A score representing a likelihood that the spelling of the word matches a particular language may be assigned. For example, a score may be assigned to two or more languages from which the textual identifier (or portions thereof) likely originated. In some aspects, the score may be probabilistic weights assigned to each of the different languages to improve identification of the language of origin. The one or more languages with the highest scores for the foreign word may be identified as the language of origin. If the text is "Gotye," for example, a probabilistic weight of 70% may be assigned to French and 30% to German. Based on this determination, an expected pronunciation of the word for both French and German and the corresponding probabilistic weights may be added to the lexicon. This implementation allows the most likely language of origin of the text to be selected. In one aspect, portions of the textual identifier may have different language of origin scores. For example, the first word of the name "Ludwig van Beethoven" may have a strong German score while the middle word may have a strong Dutch score, etc. Portions of words may also have different language scores from each other. Such different scores may be used to create different expected pronunciations as described below.

In some aspects, the classifier may be implemented based on a machine learning classifier where features of a language are developed. The features may include certain letter combinations in the beginning, middle or end of a textual identifier word string. Based on these features, scores may be assigned to different languages that are likely to incorporate the features. For example, the classifier identifies features like the presence of V-A-N in the middle of a word string may imply a language of origin of Dutch. The classifier assigns points or weights to each of the potential languages of origin based on the likelihood that the textual identifier originated from each of those languages. Other classifier models include a support vector machine/model or a maximum entropy model, character level language model and conditional random fields model. These models may combine the features and the scores for the different languages to score the most likely languages of origin.

In some aspects of the disclosure, the language of origin of the foreign word may be determined based on the language of origin of other textual identifiers associated with the content item. For example, if the name of one or more songs of a particular artist or lyrics of the song are in German then the likelihood that a name of the artist is of German origin may be increased. In this case, the song titles may be used as evidence to determine the language of origin of the name of the artist. In addition, the other textual identifiers may include metadata associated with the content to be identified. For example, an item of digital content may be associated with metadata that either identifies or may be used to identify the language of origin of the textual identifier. Other relationships between textual identifiers may be explored to adjust the determination of language of origin.

Once one or more languages of origin are associated with a textual identifier (or portions thereof), the system may determine expected pronunciation(s) of the textual identifier based on the textual identifier's language(s) of origin and text.

In some aspects of the disclosure, a conversion model, such as grapheme to phoneme (G2P) conversion or pronguessing model may be developed for each potential language of origin. The conversion model derives a pronunciation of a foreign text from a spelling of the foreign text. Each language includes different language units such as phonemes. Cross lingual mapping techniques may be employed to determine an expected pronunciation of the foreign word. Phonemes of a first language (e.g., German) may be mapped to phonemes of a second language (e.g., English) that are most similar to the phonemes of the first language. However, some pronunciations/phonemes in German may not be similar or correspond to any standard English phoneme. For example, the German pronunciation of the first letter 'r' in Kraftwerk does not correspond to an English phoneme. The German pronunciation of the letter 'r' is actually a 'uvular/r/' which is a cross between a pronunciation of the letter 'h' and a pronunciation of the letter 'r.' In such cases, the German phoneme may be mapped to the closest English phoneme.

In one aspect of the present disclosure, linguistic techniques are used to determine a closest pronunciation of the foreign word. For example, linguistic articulatory features such as 'backness,' 'roundness,' place or articulation and so on may be implemented to determine the closest pronunciation of the foreign word. The place of articulation may be a place in an oral cavity where articulators (e.g., tongue, teeth, soft palate, etc.) restrict, shape or close a flow of air during vocalizations. Examples include bilabial (between the lips), labiodental (between the lips and teeth), alveolar (immediately behind the teeth), and uvular (near the uvula). 'Backness' may be defined as a degree to which a sound (usually a vowel) is articulated towards a throat. Back vowels may include 'au' of 'caught', 'o' of 'rote', and 'u' of 'lute'. 'Roundness' or 'rounding' may be defined as a degree to which a sound (often a vowel, but not always) is articulated with rounded lips. Rounded vowels include 'o' of 'rote', 'u' of 'lute'. The linguistic techniques may be applied to recognize some examples of foreign words with a target phoneme using a first language recognizer, e.g., English phoneme recognizer. The recognizer then determines a potential pronunciation of the foreign word.

Some linguist techniques (e.g., expectation maximization algorithm, statistical models, Hidden Markov Models (HMMs)) may be used to analyze an association of multiple words and their corresponding pronunciations to determine an expected pronunciation of a new word. For example, a lexicon including German words and corresponding German pronunciations may be analyzed to determine an association between letter sequences, phoneme sequences and sounds of each word. For example, an expectation maximization algorithm may learn that letters P-H in English may be pronounced as F barring some exceptions. The expectation maximization algorithm may also learn when E is pronounced "eh" versus "ee" and so on. A model may be developed based on the analysis of the expectation maximization algorithm and used to predict a new phoneme sequence and subsequently an expected pronunciation of a new word. The linguistic techniques may be used in conjunction with other techniques to determine an expected pronunciation of the foreign word.

The linguistic techniques also allow for predicting multiple alternate pronunciations for a textual identifier based on the language(s) of origin. For example, the multiple pronunciations of each textual identifier may be represented by a graph. Different portions of the graph may represent possible pronunciations for different portions of a textual identifier. Some portions of the graph, e.g., the edges of the graph, may be assigned scores or weights to indicate the likelihood of a path on the graph. Different graphs may be developed to represent different languages (e.g., English and German). For example, separate graphs may be developed for English and German pronunciations. In some aspects, however, the separate graphs may be combined together to predict hybrid pronunciations of foreign word. The combination graph allows for swapping between the two languages as the pronunciation of the textual identifier progresses, which may be desirable in situations where a user may pronounce portions of a textual identifier favoring one language and other portions of a textual identifier favoring another language.

For example, the German band "Kraftwerk" may be pronounced in German (e.g., K HH AA F T V EH R K). However, some users may not be familiar with the German pronunciation and may pronounce the band name "Kraftwerk" as if it was an English word (e.g., K R AE F T W UR K.) Further, some users may not be consistent with their choice of pronunciation of the band name. As a result, a textual identifier (such as the band name "Kraftwerk") may be matched to multiple expected pronunciations, where each expected pronunciation may itself be based on multiple different languages, including a language(s) of origin of the textual identifier Some users may have a first language of origin but reside in a country (or operate an ASR device) where the user communicates in a different language. These users may pronounce foreign word using a combination of pronunciations from multiple languages including the user's language of origin. The user may pronounce a portion of the foreign word in a first language and other portions in one or more different languages. For example, the user may pronounce a first portion of the band name, Kraftwerk, in English (e.g., K R AE F T) and a second portion in German (e.g. V EH R K.)

Each of the English pronunciation, K R AE F T W UR K, the German pronunciation, K HH AA F T V EH R K, and the combination pronunciation K R AE F T V EH R K may be matched to the band name when added to the lexicon. The multiple expected pronunciations and the band name may be linked to songs by the band stored in the ASR device or elsewhere.

The expected pronunciations of the foreign word may also be based on a pronunciation history of a particular user. For example, the ASR system may be trained to recognize pronunciation patterns or idiosyncrasies of a particular user. If a word is weighted at 80% French and 20% English based on the spelling of the word, a classifier or speech recognition model may adjust the weights assigned to the languages based on idiosyncrasies of the particular user. The pronunciation pattern may also be based on a rank of languages favored by the particular user. For example, weights assigned to the languages may be adjusted based on the language(s) favored by the user. For example, the name, Ludwig van Beethoven, may have different versions of pronunciations because of its German and Dutch origin. In this case, weights may be assigned to German (e.g., 60%) and Dutch (e.g., 40%). The assigned weights may be adjusted based on whether the particular user favors English, German or Dutch, when pronouncing words of foreign origin, such as the name Ludwig van Beethoven. The resulting pronunciation may be a hybrid or combination of German, Dutch and English.

The pronunciation pattern of the user may be determined based on a history pronunciations of a same or different words by the user. Based on the pronunciation pattern or history, the ASR device may anticipate future pronunciation of a same or different word by the user. The ASR device may also learn whether a user is familiar with a pronunciation of one or more languages based on the pronunciation pattern of the user. For example, based on the user's history of pronunciation of the band name, Kraftwerk, the ASR device may anticipate the user's pronunciation of other German words, such as "Einstürzende Neubauten" or "Gustav Mahler." The ASR device may also assign weights to various languages for the particular user based on the pronunciation pattern of the user. For example, the ASR device may assign more weight to a pronunciation (e.g., in one language or a combination of languages) that the user favors when pronouncing words of foreign origin. Similarly, the representation of the favored language or favored path of a particular user on a graph may be assigned a higher score or weight. The assignment of the higher scores allows these paths of the graph to become more likely to represent an expected pronunciation of a foreign word by the user. Thus, the expected pronunciations may be associated with a graph of expected pronunciations, an N-best list of expected pronunciations, or some other organization of expected pronunciations.

Furthermore, multiple users with similar behavior may be clustered together for purposes of weighting or determining expected pronunciations. Features of the automatic speech recognition techniques for the clustered users are selected based on the behavior of the clustered users. For example, the cluster of users may have similar musical taste (e.g., music with Indian origin), and may therefore have music catalogs dominated by Indian music. As a result, a pronunciation from a new user included in the cluster may be processed similar to other users in the cluster or may follow similar pathway along the graph (representing the possible pronunciations of a foreign word). Weights may be assigned to corresponding features of the speech recognition techniques (e.g., pronunciation, preferred language, etc.) associated with the cluster of users. Thus, the graph (representing the possible pronunciations of a foreign word) may be trimmed based on the behavioral pattern of a user or a cluster of users with the similar behavioral patterns.

Figure 6:
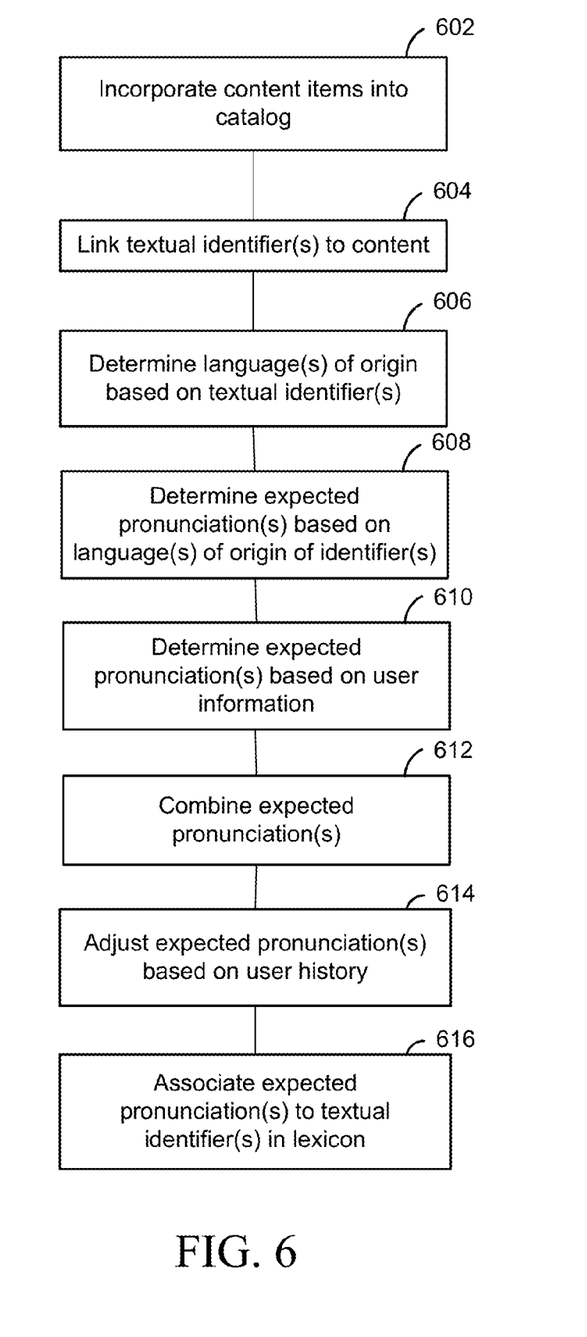
FIG. 6 illustrates a speech recognition method for predicting an expected pronunciation of a word of foreign origin based on a language of origin of the word according to one aspect of the present disclosure.

FIG. 6 illustrates a flow chart of a method for predicting an expected pronunciation of a foreign text based on a language of origin in speech recognition according to one aspect of the present disclosure. The method may be implemented at the expected pronunciation predicting module 128, ASR device 100 and/or a remote speech processing device (e.g., ASR device 302). At block 602, content to be made available to from a user may be incorporated into a catalog available to an ASR device 100. At block 604, one or more textual identifiers may be linked to the content item, as shown in block 604. At block 606, the ASR system may determine one or more languages of origin based on the textual identifier(s). The language(s) of origin may each be associated with a score and/or a specific portion of the textual identifier(s). At block 608, the ASR system may determine one or more expected pronunciation(s) of the textual identifier based at least in part on the determined language(s) of origin. The expected pronunciation(s) based on the language(s) of origin may each be associated with a score and/or a specific portion of the textual identifier(s). At block 610, the ASR system may determine one or more expected pronunciation(s) of the textual identifier based at least in part on user information and/or the user history. The user history may include a native language, or frequently used language of the user. The user history may also include how a user has previously pronounced similar words. The user information may also include a determined language(s) of an environment of the device or the user. The language of the environment may include a language used at a location of a device, which may be determined by correlating location data with a known language(s) of a geographic region, by determining a language(s) identified in other speech detected by the device, or through other means. The language of the environment may also include a default language of the ASR system. The expected pronunciation(s) based on the language(s) of the user may each be associated with a score and/or a specific portion of the textual identifier(s).

At block 612, the ASR system may combine the expected pronunciations and determine one or more expected pronunciation(s) of the textual identifier based at least in part on combination of the language(s) of origin of the textual identifier and the determined language(s) of the user. The expected pronunciation(s) based on the combination of language(s) of the user may each be associated with a score and/or a specific portion of the textual identifier(s). At block 614, each the expected pronunciations(s) and/or the weights or priority thereof may be adjusted based on user history, such as the typical pronunciations of the user or a category of users. At block 616, the expected pronunciation(s) may be associated with the textual identifier(s) and/or content items in the lexicon.

The above determination of expected pronunciations may occur during training or configuration of an ASR system, or may be performed as new content becomes available to an ASR device, either through being added to a local storage or by becoming accessible to an ASR device but stored remotely. The determination of an expected pronunciation may be performed by a local ASR device, remote ASR device, or combination thereof.

Figure 7:
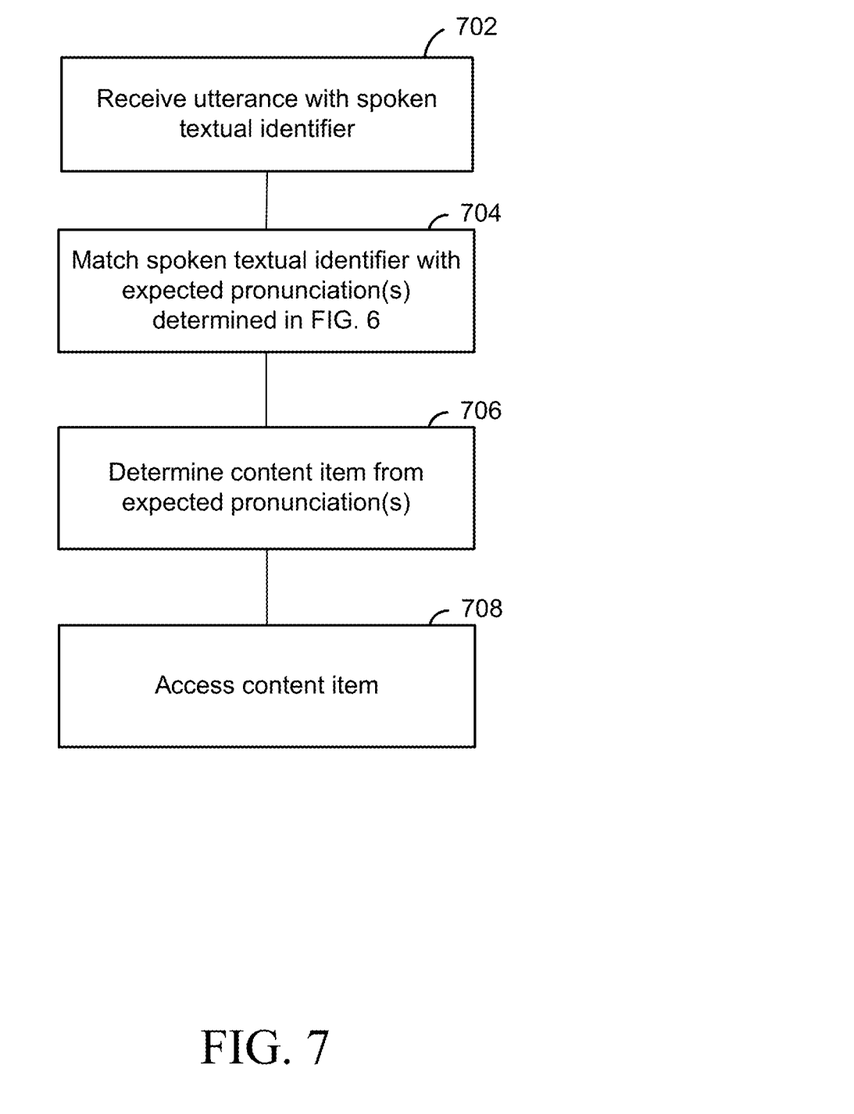
FIG. 7 illustrates a speech recognition method for processing a spoken utterance including a textual identifier according to one aspect of the present disclosure.

Upon receiving a spoken utterance, an ASR system may process the utterance as shown in FIG. 7. At block 702, an utterance including a spoken textual identifier is received. At block 704, the ASR system may match the spoken textual identifier with one or more expected pronunciation(s) for a textual identifier. The matching may include returning an N-best list of potential matches or simply returning a highest scoring match. At block 706, a content item associated with the highest scoring matching textual identifier is determined. At block 708, the content item is accessed and any command associated with the utterance (such as playing music) may be executed by the ASR system or by another device.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the ASR techniques described herein may be applied to many different languages, based on the language information stored in the speech storage.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for processing a spoken utterance, the method comprising:
   receiving a single word comprising a first portion and a second portion;
   determining a first language of origin of the first portion;
   determining a first score associated with the first language of origin;
   determining a second language of origin of the second portion;
   determining a second score associated with the second language of origin;
   determining a plurality of potential pronunciations of the single word based at least in part on the first score and the second score, wherein each of the plurality of potential pronunciations is associated with a respective pronunciation score and wherein the plurality includes at least one hybrid pronunciation of the single word based on the first language of origin and the second language of origin;
   receiving a spoken utterance comprising a request to output audio content;
   matching a portion of the spoken utterance with one of the plurality of potential pronunciations based at least in part on a pronunciation score of one of the plurality of potential pronunciations;
   identifying the audio content based at least in part on the one of the plurality of potential pronunciations; and
   causing the audio content to be played by a computing device.

2. The method of claim 1, in which determining the plurality of potential pronunciations is further based at least in part on a user pronunciation history of a word with at least one language of origin in common with the single word.

3. The method of claim 1, in which determining the first language of origin and the second language of origin of the single word is based at least in part on a language of origin of other audio content capable of being played by the computing device.

4. A computing system, comprising:
   at least one processor; and
   at least one memory including instructions that, when executed by the at least one processor, cause the computing system to:
      receive audio data corresponding to an utterance;
      determine a first score corresponding to a likelihood that a first portion of the audio data represents a first potential pronunciation of a first portion of a single word, the first potential pronunciation of the first portion of the single word corresponding to a first language of origin;
      determine a second score corresponding to a likelihood that a second portion of the audio data represents a second potential pronunciation of a second portion of the single word, the second potential pronunciation of the second portion of the single word corresponding to a second language of origin;
      determine that the audio data includes a representation of a combined potential pronunciation of the single word based at least in part on the first score and the second score, wherein the combined potential pronunciation of the single word comprises a hybrid pronunciation based on the first language of origin and the second language of origin;
      identify content based at least in part on the single word; and
      cause the content to be output.

5. The computing system of claim 4, wherein determining the combined potential pronunciation is further based at least in part on a pronunciation history of a user.

6. The computing system of claim 5, wherein the pronunciation history of a user comprises a language spoken by the user.

7. The computing system of claim 4, wherein determining at least one of the first language of origin and the second language of origin is further based at least in part on a language of origin of a textual identifier associated with a content item, wherein the single word is associated with the content item.

8. The computing system of claim 4, wherein the at least one memory further includes instructions that, when executed, further configure the at least one processor to:
   retrieve at least a portion of a content item associated with the single word.

9. The computing system of claim 4, wherein the single word comprises a name of an artist, album, band, movie, book, song, and/or food item to be accessed by the computing system.

10. The computing system of claim 4, wherein the combined potential pronunciation is based at least in part on a potential spoken language associated with a location of a device.

11. The computing system of claim 4, wherein the at least one processor is further configured to determine the combined potential pronunciation of the single word using at least one of a finite state transducer (FST) model, a maximum entropy model, a character level language model, and/or a conditional random fields model.

12. The computing system of claim 4, wherein determining the audio data includes the representation of the combined potential pronunciation comprises matching a feature vector corresponding to the combined potential pronunciation to an acoustic unit corresponding to the audio data.

13. A method, comprising:
   receiving audio data corresponding to an utterance;
   determining a first score corresponding to a likelihood that a first portion of the audio data represents a first potential pronunciation of a first portion of a single word, the first potential pronunciation of the first portion of the single word corresponding to a first language of origin;
   determining a second score corresponding to a likelihood that a second portion of the audio data represents a second potential pronunciation of a second portion of the single word, the second potential pronunciation of the second portion of the single word corresponding to a second language of origin;

determining that the audio data includes a representation of a combined potential pronunciation of the single word based at least in part on the first score and the second score, wherein the combined potential pronunciation of the single word comprises a hybrid pronunciation based on the first language of origin and the second language of origin;

identifying content based at least in part on the single word; and causing the content to be output.

14. The method of claim 13, wherein determining the combined potential pronunciation is further based at least in part on a pronunciation history of a user.

15. The method of claim 14, wherein the pronunciation history of a user comprises a language spoken by the user.

16. The method of claim 13, wherein determining at least one of the first language of origin and the second language of origin is further based at least in part on a language of origin of a textual identifier associated with a content item, wherein the single word is associated with the content item.

17. The method of claim 13, further comprising retrieving at least a portion of a content item associated with the single word.

18. The method of claim 13, wherein the single word comprises a name of an artist, album, band, movie, book, song, and/or food item.

19. The method of claim 13, wherein the combined potential pronunciation is based at least in part on a potential spoken language associated with a location of a device.

20. The method of claim 13, further comprising determining the combined potential pronunciation of the single word using at least one of a finite state transducer (FST) model, a maximum entropy model, a character level language model, and/or a conditional random fields model.

21. The method of claim 13, wherein determining the audio data includes the representation of the combined potential pronunciation comprises matching a feature vector corresponding to the combined potential pronunciation to an acoustic unit corresponding to the audio data.

* * * * *